Patented Jan. 3, 1950

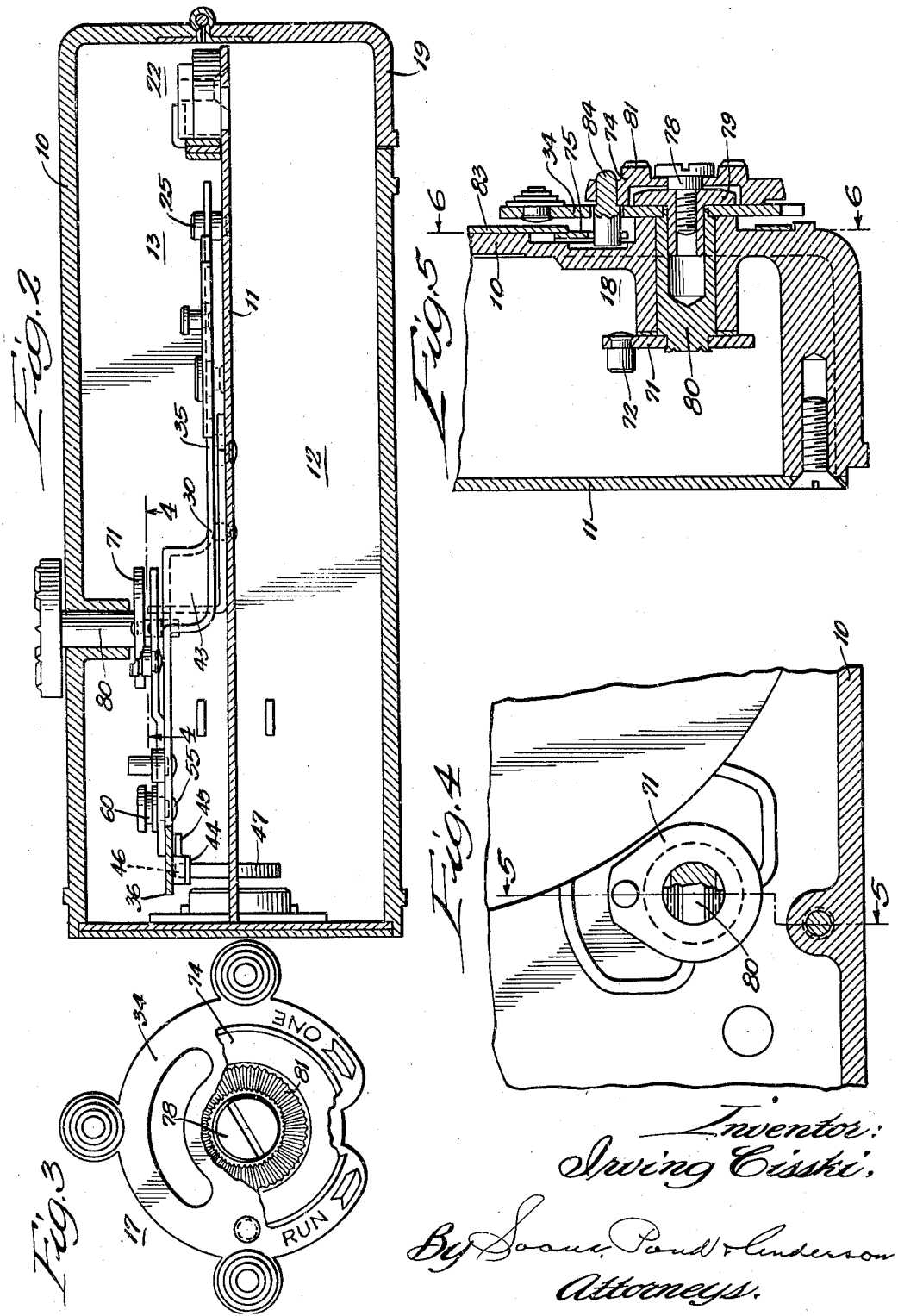

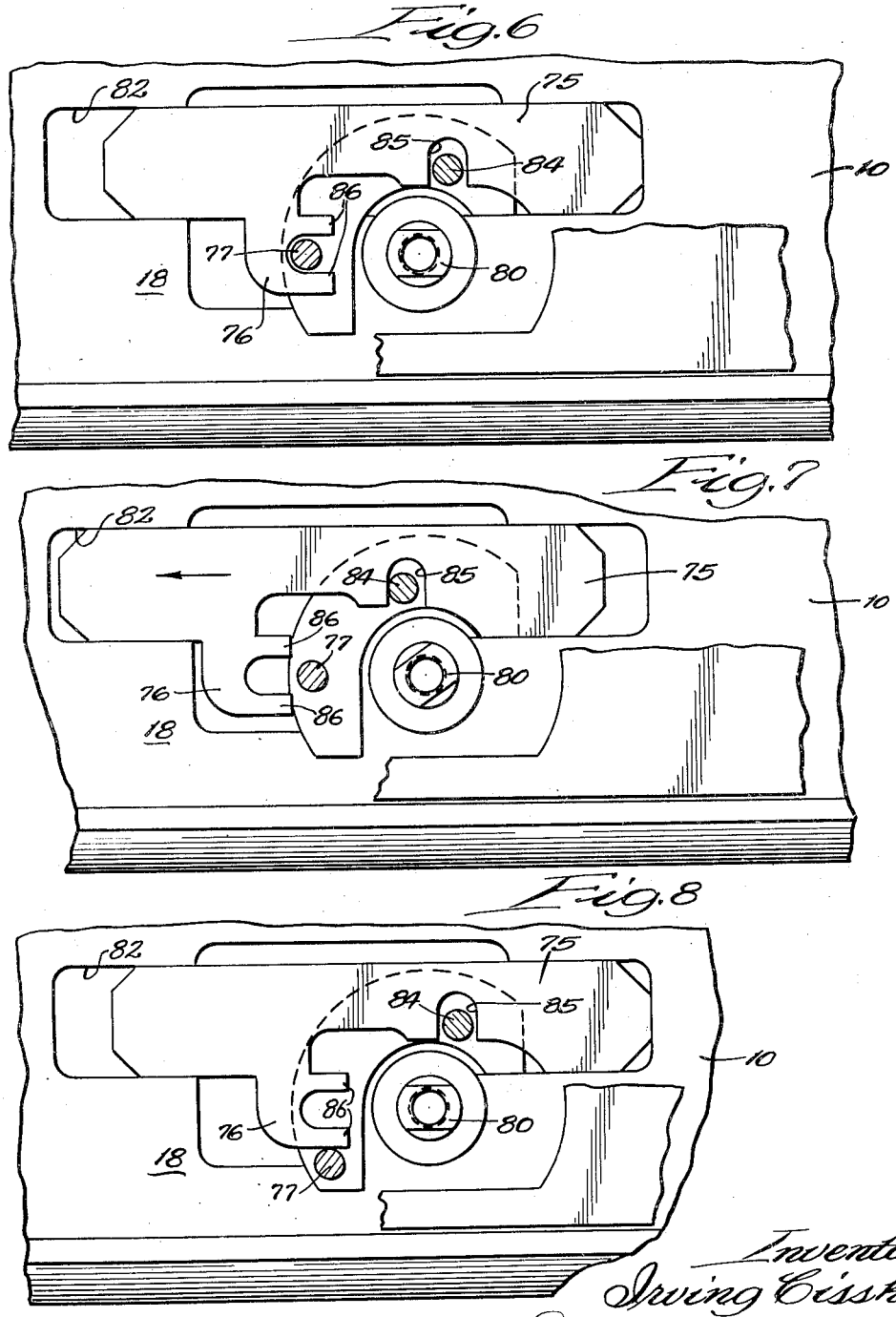

2,493,443

UNITED STATES PATENT OFFICE 2,493,443

LOCKING MECHANISM FOR OPERATION-CONTROL MECHANISM FOR MOTION-PICTURE CAMERAS

Irving Cisski, Schiller Park, Ill., assignor to Ampro Corporation, Chicago, Ill., a corporation of Illinois Application August 2, 1946, Serial No. 687,923

5 Claims. (Cl. 88—17)

1

This invention relates to locking means for the operation-control mechanism for motion picture cameras.

For motion picture cameras there are two occasions when the operator, particularly the non-professional, may find it advantageous to be able to lock the operation-control mechanism against actuation. One of these is when the camera is in transit, and especially if it is being carried in a coat pocket. The other is when the operator desires to be included in the scene which he is about to take.

The main objects of this invention, therefore, are to provide an improved form of locking means for the operation-control mechanism for motion picture camera; to provide improved means of this kind which is adapted to lock the operation-control mechanism in its normal neutral position or in its "run" position; to provide an improved associational arrangement of the actuating member for the locking means with the actuating member of the starting means for the operation-control mechanism so that as occasion may require both members may be shifted by fingers on one and the same hand; and to provide a locking means of this kind which is simple in construction and positive in operation.

A preferred embodiment of this invention is shown in the accompanying drawings, on a scale considerably larger than actual size, wherein:

Fig. 1 is an enlarged transverse sectional view of a camera showing in elevation the related parts of an improved operation-control mechanism wherewith this improved locking means is associated; the view also shows the relationship of said operation-control mechanism with the torque-controlled actuator and the magazine-operated cam member, the predetermined movement of either of which is adapted to render the operation-control mechanism ineffective;

Fig. 2 is a horizontal sectional view taken on the line 2—2 of Fig. 1;

Fig. 3 is an elevational detail, partly broken away, of the concentrically-mounted members by which the operation-control mechanism and the locking means therefor are actuated;

Fig. 4 is an inside elevational detail of the connection between the starting means and the operation-control mechanism, taken on the line 4—4 of Fig. 2;

Fig. 5 is a transverse sectional view of the associated starting and locking means, as viewed from the plane of the line 5—5 of Fig. 4;

Fig. 6 is a fragmentary detail of the locking bar shown in position to lock the starting means, for

Figure 1:
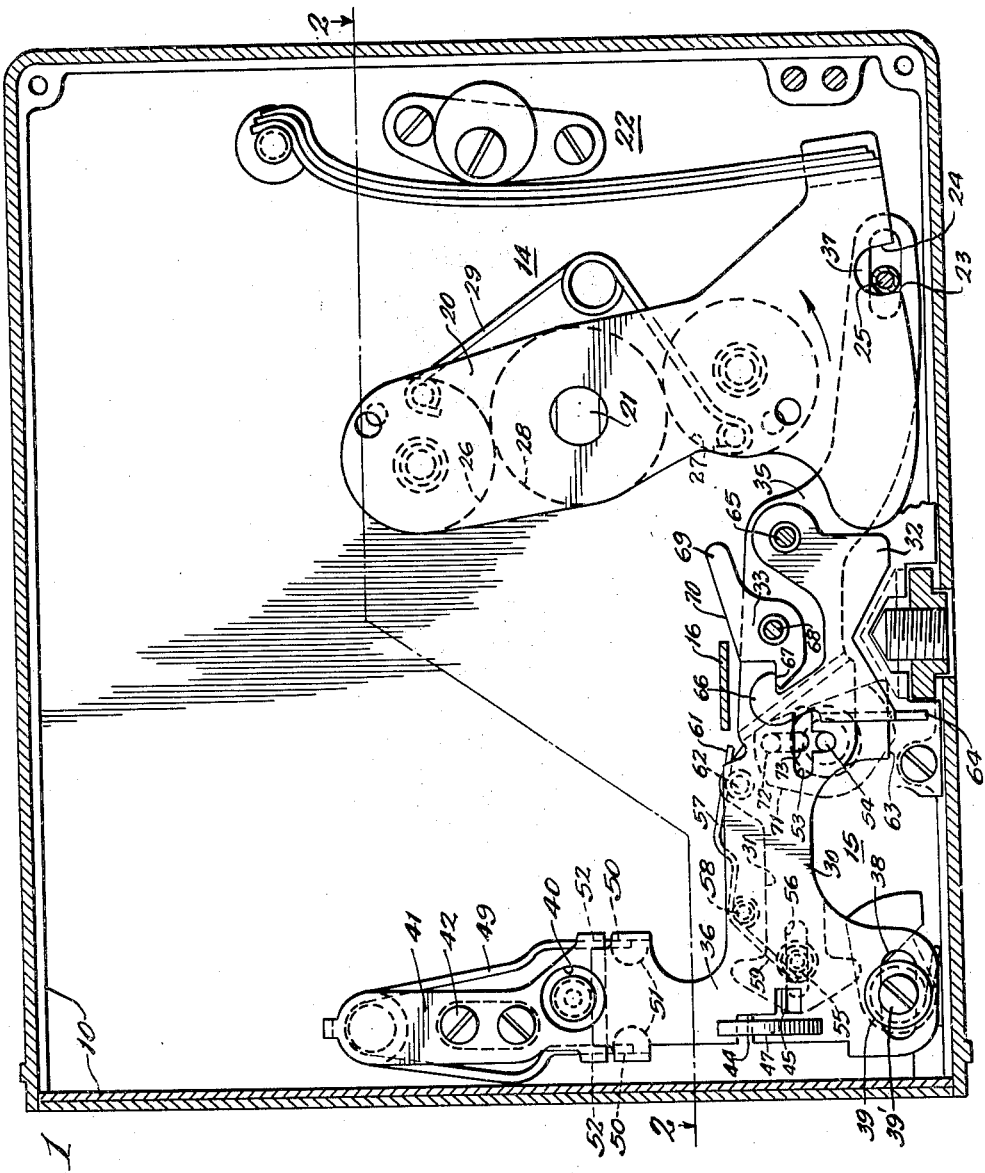

2 the operation-control mechanism, in its neutral non-operative position, the view being taken on the line 6—6 of Fig. 5;

Fig. 7 is a similar view showing the bar shifted to its non-locking position; and Fig. 8 is a similar view showing the bar shifted to its locking position after the actuating member for the operation-control-mechanism starting-means has been shifted to its "run" position.

A motion picture camera embodying this improved locking means for the starting means for the operation-control mechanism comprises a housing 10 divided by a vertical partition 11 to form a magazine compartment 12 and a motor compartment 13, in the latter of which is arranged a motor (not shown) in association with the torque-controlled actuator 14. The usual train of gears (not shown) connects the motor to operate a film-shutter and -transport mechanism (not shown) as permitted by the operation-control mechanism 15, unless it is otherwise rendered ineffective by means of the torque-controlled actuator 14 or the magazine-controlled cam member 16. The starting means 17 (Fig. 3) for the operation-control mechanism 15 may be locked in its "neutral" or "run" positions by means of the improved locking mechanism 18 (Fig. 5).

The housing 10 is provided with a hinged door 19, the opening of which permits the insertion of a magazine into or its removal from the compartment 12 and the consequent control of the mechanism effecting the shifting of the cam member 16, as will appear more fully from co-pending application Serial No. 640,951, filed January 12, 1946, now Patent Number 2,433,601, issued June 22, 1948. Although not herein shown, the housing 10 has a front end cap wherein is mounted a film-shutter and -transport mechanism of the type disclosed in co-pending application Serial No. 640,952, filed January 12, 1946.

The construction and operation of torque-controlled actuator 14 is disclosed in greater detail in co-pending application Serial No. 640,957, filed January 12, 1946. This actuator 14 comprises an arm 20 swingably mounted on a shaft 21 to which the spring of the motor is attached. The arm has a limited swinging movement in opposite directions under the force of the torque of the spring motor or the adjustable resilient means 22—depending upon which is the stronger—as may be permitted by the engagement of the shoulders 23 and 24 against the pin 25. The torque of the spring motor is exerted on the arm 20 by means of discs 26, 27, and 28, so as to swing the arm counterclockwise, as shown by the arrow in Fig.

1. The peripheries of the discs 26 and 27 are urged into contact with the periphery of the disc 28 by means of a spring 29.

Up to a certain point in its unwinding, the torque of the spring motor will hold the arm 20, in what might be termed its retracted position, with the shoulder 23 pressing against the pin 25. When the torque drops, so that its force on the arm 20 becomes less than the pressure exerted by the adjustable resilient means 22, the bottom of the arm will be swung in a clockwise direction to render the operation-control mechanism 15 inoperative, as set for fully in co-pending application Serial No. 640,949, filed January 12, 1946, now Patent No. 2,442,756.

The operation-control mechanism 15, to the extent that it is herein shown, comprises a trigger bar 30, a pin-retracting lever 31, a cam rocker arm 32, and a cam lever 33, so associated that upon the shifting of a dial or actuating member 34, of the starting means 17 (Fig. 3), the spring motor will cause the operation of the film-shutter and -transport mechanism, unless the operative relationship of the afore-named parts has been rendered ineffective by a shifting of the torque-actuated arm 20 or the magazine-controlled cam member 16.

The trigger bar 30 approximates the form of a T, with the stem 35 extending nearly the full length of the housing 10 and with the transverse part 36 located near the forward end of the housing adjacent to an end cap (not shown) wherein is enclosed the aforesaid film-shutter and -transport mechanism. The trigger bar 30 is slotted at 37 and 38 whereby it is slidably supported on the pin 25, which is secured to the partition 11, and a bushing 39, mounted on a machine screw 39' secured to the adjacent housing 10. The bar 30 is guided in its sliding movement by having the upper end of the transverse part 36 received in a flanged roller 40 mounted on a plate 41 secured to the housing 10 by means of screws 42.

As will be noted more particularly from Fig. 2, the trigger arm 30 has the forward and rear portions of the stem offset at 43 so that the forward portion of the stem 35 and the tansverse part 36 are located about halfway between the partition 11 and the adjacent wall of the housing 10. The transverse part 36 of the trigger bar 30 has tongues or stops 44 and 45 upset therefrom so that upon the shifting of the trigger bar 30 one or the other of said shoulders may be moved into and out of engagement with a shoulder 46 on a trigger cam 47.

The character and the mounting of the trigger cam 47, and its connection with a spring motor, are not shown herein. These details, however, are presented in co-pending application Serial No. 640,955, filed January 12, 1946, now Patent No. 2,482,744. From such co-pending application it will be noted that this trigger cam 47 is mounted on a shaft connected to a motor, through a suitable gear train, and driven in a clockwise direction (as viewed from the left of Fig. 2) when the trigger bar 30 is shifted to move one or the other of the stops 44 or 45 out of the path of said trigger-cam shoulder 46. Such release of the trigger cam 47 permits the operation of the film-shutter and -transport mechanism as has been set forth more fully in the aforesaid co-pending application Serial No. 640,952.

The trigger bar 30 is held in its normal or neutral position, with the stop 44 engaged by the shoulder 46 on the trigger cam 47, by means of a hairpin-shaped spring 49 secured at the upper end of the bracket 41 so that the ends 50 of the spring bear against and are retained in position by the flanged ears 51 formed on the upper end of the transverse part 36 of said trigger bar 30. Comparable flanged ears 52, formed on the bracket 41, engage the respective legs of the spring 49 and limit them to movement in but one direction.

A T-shaped slot 53 is formed in the stem 35 of the trigger bar 30, a little less than half the distance of its length from the transverse part 36. The slot 53 receives a pin 54 carried on the pin-retracting lever 31.

The pin-retracting lever 31 simulates the shape of a pistol and is supported on the trigger bar 30 on a sliding pivot formed by a pin 55 secured to the trigger bar 30 and extending through a slot 56 formed in the forward end of the pin-retractinng lever 31. A spring 57, secured by a pin 58 on the trigger bar 30, has the end 59 thereof received in a slot 60 formed in the pin 55 and the other end 61 pressing against a pin 62 on the pin-retracting lever 31. The pin 54 is thereby urged into the bottom of the stem of the T-shaped slot 53 in the trigger bar 30, so that the trigger bar 30 and the pin-retracting lever 31 will move as a unit, and position the bottom edge 63 of the rear end of the pin-retracting lever 31 for engagement by a shoulder 65 on the cam rocker arm 32, as will appear more fully hereinafter.

The cam rocker arm 32 is pivoted to a pin 65 secured to the partition 11. With the camera in its normal upright position the weight of the cam rocker arm 32 retracts it from the edge 63 of the lever 31, unless, perchance, the balance of the cam lever 33 should be such that the engagement of the hook 66 with the shoulder 64 will cause the shoulder on the cam rocker arm 32 to be held in contact with said edge 63. On the other hand, the balance of the cam lever 33 may be such that the lower edge of the shoulder part 64 may rest on the bottom of the camera housing. Should the camera be placed in an inverted position, the weight of the cam rocker arm 32 will cause the shoulder 64 to rest against the edge 63 of the pin-retracting lever 31. However, the spring 57 will prevent the cam rocker arm 32 from having any effect on the lever 31.

The cam lever 33 is pivoted on a pin 68 secured to the partition 11. The pin 68 is positioned in the cam lever 33 so that the end 69 of the lever overbalances the other end. Thus the shoulder 67 is normally held against the hook 66 of the cam rocker arm 32. This mounting of the member 33 locates the inclined surface 70 of the end 69 in the path of the magazine-controlled cam member 16, so that the movement of the latter to the right of Fig. 1 will depress the outer end 69 of the cam lever 33. This, in turn, will cause an elevation of the rocker arm 32 and render the control mechanism 15 inoperative, in the manner that has been set forth in the aforesaid co-pending application Serial No. 640,949.

The starting means 17 includes an actuating member or dial 34 which is mounted on the external right-hand side of the camera housing 10 and which is connected to a disc 71 (see Figs. 2 and 5) journaled on the housing and mounting a pin 72 on the inner face thereof. The pin 72 extends into an elongated slot 73 formed in the pin-retracting lever 31 in vertical alinement with the stem part of the T-slot 53 in the trigger bar 30.

The locking mechanism 18, associated with the starting means 17, comprises a disc member 74 which operates a bar 75 to move a bifurcated extension 76 into and out of position to engage a pin 77 which moves in unison with the pin 72 on the disc 71.

The disc 74 is concentrically mounted with respect to the dial 34 by means of a threaded pin 78 which screws into a pin 79 which in turn secures the dial 34 to a shaft 80 on the inner end of which is mounted the disc 71. The outer face of the member 74 is serrated at 81 to insure a better contact of the fingers therewith when it is desired to rotate said member.

The bar 75 is slidably mounted in a recess 82 formed in the side of the housing 10 and is retained in position by a plate 83 so that it can have a limited movement back and forth when the member 74 is rotated. To that end a pin 84 mounted on the member 74 is received in a slot 85 formed in the bar 75.

The bifurcated part 76 depends from the bar 75 in position so that its pair of prongs 86 are adapted to receive the pin 77 when the member 34 is in its neutral non-operative position. This bifurcated part is so shaped that when the member 34 is shifted for a continuous "run" the lower prong 86 is positioned so that the lower side thereof is engaged by the pin 77 and the member 34 is held in its "run" position until the bar 75 is retracted.

The operation of this improved locking means is as follows:

Normally, the several, hereinbefore-described parts of the operation-control mechanism 15 occupy the positions shown in Fig. 1. If the motor spring is not completely unwound and the magazine is in place and the locking mechanism 18 is retracted, the camera is ready for use. As has been fully set forth in the aforesaid co-pending application Serial No. 640,949, a movement of the dial 34 will cause the pin 72 to shift the pin-retracting lever 31 which will cause the pin 54 to shift the trigger bar 30 and release the trigger cam 47 to permit the operation of the film-shutter and -transport mechanism.

If the camera is to be transported in a pocket or other receptacle, it will be desired generally to lock the dial against accidental movement. To that end the member 74 may be turned clockwise, whereupon the bifurcated extension 76 of the bar 75 is shifted into the position shown in Fig. 6. The pin 77 being engaged between the prongs 86 of the bifurcated extension 76 the dial or member 34 may not be shifted.

On occasion the operator of the camera may desire to be in a scene which is to be "shot." Assuming that the locking means 18 is retracted, it is only necessary, after having shifted the starting dial 34 to "run" position, to turn the member 74, again in clockwise direction. Thereupon the lower prong of the bifurcated extension 76 is moved into position to engage the pin 77 and prevent the return of the starting dial 34 when the finger is released therefrom.

These two members 34 and 74 being concentrically mounted in close association makes it possible for the operator to turn the member 74 with one or two of the fingers of the same hand whereon one of the fingers has shifted the starting dial 34 into its "run" position.

Variations and modifications in the details of structure and arrangement of the parts may be resorted to within the spirit and coverage of the appended claims.

I claim:

1. A device of the class described comprising, a member shiftable in opposite directions from a normal neutral position and connected to actuate the operation-control mechanism for a motion picture camera, a second member mounted adjacent to said first-mentioned member and shiftable to occupy either of two positions, a bar connected to be actuated by said second-mentioned member, a pair of shoulders on said bar, and a shoulder on said first-mentioned member adapted to be engaged by said shoulders to selectively lock said first-mentioned member against movement in its neutral position or one of its shifted positions.

2. A device of the class described comprising, a member pivoted to rotate in opposite directions from a normally neutral position and connected to actuate the operation-control mechanism for a motion picture camera, a second member concentrically mounted with respect to said first-mentioned member and rotatable to occupy either of two positions, a bar connected to be shifted by said second-mentioned member, a bifurcated extension on said bar, a connection between said second-mentioned member and said bar whereby the rotation of said member causes a shifting of said bar, and a shoulder on said first-mentioned member positioned to be shifted to engage said bifurcated extension to lock said first-mentioned member in its neutral position when said second-mentioned member is shifted to one of its positions, said shoulder being adapted to be engaged by one of the prongs of said bifurcated extension when said first-mentioned member has been shifted to one of its non-neutral positions and said second member has been shifted to said one of its positions.

3. A device of the class described comprising a member shiftable in opposite directions from a normal neutral position and connected to actuate the operation-control mechanism of a motion picture camera, means mounted adjacent and separate from said member for shifting from an unlocking to a locking position for positively locking said member in its neutral position and similarly shiftable to the same locking position when said member has been moved into another of its positions to lock said member in such position, and mechanism manually operable independently of said member for moving said means between its unlocking and locking positions.

4. A device of the class described comprising, a control member shiftable in opposite directions from a normal neutral position and connected to actuate the operation-control mechanism of a motion picture camera, said member having a locking surface moving to different positions by shifting of the member, a locking member mounted adjacent said control member and shiftable between a locking and an unlocking position, and means carried by said locking member for cooperation with said locking surfaces when the locking member is in its locking position to prevent shifting of the control member when in its neutral position, and to prevent shifting to its neutral position when in one of its other positions.

5. A device of the class described comprising, a control member shiftable from a neutral position to plural second positions to actuate the operation control mechanism of a motion picture camera, a locking member adjacent said control member and shiftable between a locking and an unlocking position, a blocking surface on said control member and a pair of surfaces on said control member respectively arranged to engage said blocking surface when the control member is in its neutral position and one of its second positions and the locking member is shifted to its locking position, said blocking and pair of surfaces being arranged to prevent movement of the control member from its position when such engagement occurs.

IRVING CISSKI.

REFERENCES CITED

The following references are of record in the file of this patent:

UNITED STATES PATENTS

| Number | Name | Date |
|---|---|---|
| 1,920,968 | Carpenter | Aug. 8, 1933 |
| 2,049,944 | Carpenter | Aug. 4, 1936 |
| 2,323,576 | Sperry | July 7, 1943 |
| 2,390,389 | Redler | Dec. 4, 1945 |